US011762739B2

(12) United States Patent
Liu et al.

(10) Patent No.: US 11,762,739 B2
(45) Date of Patent: Sep. 19, 2023

(54) METHOD, DEVICE, AND PROGRAM PRODUCT FOR BACKING UP DATA IN INTERNET OF THINGS

(71) Applicant: EMC IP Holding Company LLC, Hopkinton, MA (US)

(72) Inventors: Jie Liu, Chengdu (CN); Qin Liu, Chengdu (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 22 days.

(21) Appl. No.: 17/490,785

(22) Filed: Sep. 30, 2021

(65) Prior Publication Data

US 2022/0308964 A1  Sep. 29, 2022

(30) Foreign Application Priority Data

Mar. 23, 2021 (CN) .......................... 202110309476.3

(51) Int. Cl.
| | | |
|---|---|---|
| G06F 11/00 | (2006.01) | |
| G06F 11/14 | (2006.01) | |
| H04L 9/32 | (2006.01) | |
| H04L 9/08 | (2006.01) | |

(52) U.S. Cl.
CPC ...... *G06F 11/1464* (2013.01); *G06F 11/1451* (2013.01); *G06F 11/1469* (2013.01); *H04L 9/0825* (2013.01); *H04L 9/3247* (2013.01)

(58) Field of Classification Search
CPC ............. G06F 11/1464; G06F 11/1451; G06F 11/1469; H04L 9/0825; H04L 9/3247
See application file for complete search history.

(56) References Cited

U.S. PATENT DOCUMENTS

| 11,431,488 | B1* | 8/2022 | Sapuntzakis | ............ H04L 9/083 |
| 2017/0006003 | A1* | 1/2017 | Zakaria | ............... H04L 63/0442 |
| 2017/0264597 | A1* | 9/2017 | Pizot | ....................... H04L 67/02 |
| 2017/0287090 | A1* | 10/2017 | Hunn | ..................... G06Q 50/18 |
| 2018/0146367 | A1* | 5/2018 | Altin | ...................... H04W 12/50 |
| 2019/0222590 | A1* | 7/2019 | Mady | ....................... H04L 63/20 |
| 2020/0288331 | A1* | 9/2020 | Jung | ....................... A24F 40/51 |
| 2021/0067328 | A1* | 3/2021 | Verheyen | ............... H04L 9/0861 |
| 2022/0103369 | A1* | 3/2022 | Adams | .................. H04L 9/3234 |
| 2022/0150220 | A1* | 5/2022 | Verheyen | .................. H04L 9/50 |
| 2022/0166616 | A1* | 5/2022 | Manevich | ................. H04L 9/14 |
| 2022/0188444 | A1* | 6/2022 | Stoler | ....................... G06F 8/60 |

(Continued)

*Primary Examiner* — Loan L. T. Truong
(74) *Attorney, Agent, or Firm* — Chamberlain, Hrdlicka, White, Williams & Aughtry (57) ABSTRACT

A method, a device, and a program product for backing up data in the Internet of Things (IoT) is disclosed. An IoT system includes an IoT manager and a plurality of IoT devices. In response to receiving a registration request for registering an IoT device among a plurality of IoT devices with an IoT manager, a signature public key is received from the IoT device. Atomic data associated with the IoT device is received that includes a signature generated by using a signature private key corresponding to the signature public key. The signature is verified based on the signature public key. In response to the signature being successfully verified, a backup data package for backup is generated based on the atomic data. Accordingly, data may be backed up in the IoT with higher performance, thereby improving the security and reliability of the entire IoT.

15 Claims, 10 Drawing Sheets

(56) References Cited

U.S. PATENT DOCUMENTS

2022/0224532 A1\* 7/2022 Bezzateev ............... H04L 9/304
2022/0271920 A1\* 8/2022 Wells .................... H04L 63/101
2022/0271947 A1\* 8/2022 Mestery .............. H04L 61/4511

\* cited by examiner

METHOD, DEVICE, AND PROGRAM PRODUCT FOR BACKING UP DATA IN INTERNET OF THINGS

CROSS REFERENCE TO RELATED APPLICATIONS

This application claims priority under 35 U.S.C. § 119 to Chinese Patent Application No. 202110309476.3, filed on Mar. 23, 2021. The contents of Chinese Patent Application No. 202110309476.3 are incorporated by reference in its entirety.

TECHNICAL FIELD

Implementations of the present disclosure relate to Internet of Things (IoT), and more specifically, to a method, a device, and a computer program product for backing up data in an Internet of Things (IoT).

BACKGROUND

With the development of computer technologies, IoT systems have been involved in more and more fields. For example, in an IoT system such as a factory monitoring system, IoT devices can be deployed at various locations in production lines of the factory to collect various device parameters and/or image data. For another example, in an IoT system such as a traffic management system, IoT devices can be deployed at various locations in road environments to collect traffic status data at various locations. With the operation of the IoT system, more and more data may be collected. Then, how to back up data in the IoT with higher performance to improve security and reliability of the entire IoT has become a technical problem.

SUMMARY OF THE INVENTION

Therefore, it is expected to develop and implement a technical solution for backing up data in an IoT system in a more effective manner. It is desired that the technical solution may back up various data in the IoT system in a more convenient and effective manner.

According to an aspect of the present disclosure, a method for backing up data in an IoT system is provided. In this method, in response to receiving a registration request for registering an IoT device among a plurality of IoT devices with an IoT manager, a signature public key is received from the IoT device. Atomic data associated with the IoT device is received, where the atomic data includes a signature generated by using a signature private key corresponding to the signature public key. The signature is verified based on the signature public key. In response to the signature being successfully verified, a backup data package for backup is generated based on the atomic data.

According to another aspect of the present disclosure, an electronic device is provided, including: at least one processor; a volatile memory; and a memory coupled to the at least one processor, the memory having instructions stored therein, where the instructions, when executed by the at least one processor, cause the device to execute the method according to one or more aspects of the present disclosure.

According to another aspect of the present disclosure, a computer program product is provided. The computer program product is tangibly stored on a non-transitory computer-readable medium and includes machine-executable instructions, where the machine-executable instructions are used to execute the method according one or more aspects of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of examples rather than limitation. In the accompanying drawings.

DETAILED DESCRIPTION

Hereinafter, implementations of the present disclosure will be described in more detail with reference to the accompanying drawings. Although the implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

Figure 1:
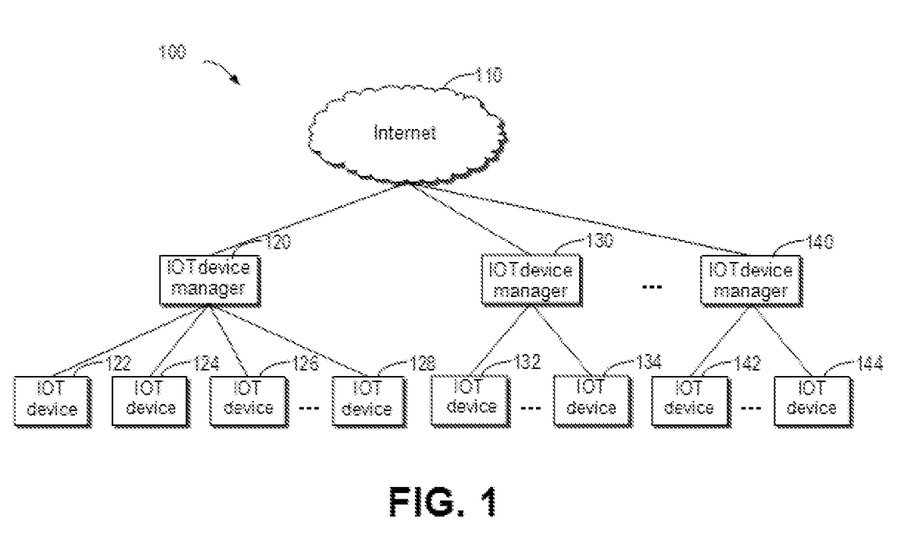
FIG. 1 schematically illustrates a block diagram of an IoT environment according to one or more embodiments of the present disclosure.

First, please refer to an example describing an IoT environment in FIG. 1. FIG. 1 schematically illustrates block diagram 100 of an IoT environment according to one or more embodiments of the present disclosure. As shown in FIG. 1, the IoT may include multiple IoT devices, and multiple IoT devices may be connected to different IoT device managers. For example, IoT devices 122, 124, 126, . . . , and 128 may be connected to IoT device manager 120, and IoT devices 132, . . . , and 134 may be connected to IoT device manager 130, and IoT devices 142, . . . , and 144 may be connected to IoT device manager 140.

In different IoT environments, IoT devices can have different types and are used to collect different types of data. For example, in a factory monitoring system, image collection devices, video collection devices, temperature collection devices, humidity collection devices, etc. may be deployed at various positions of a production line. In a traffic management system, image collection devices, speed collection devices, etc. may be deployed along a road. IoT devices usually only have small storage space and processing capabilities, and need to continuously transmit collected devices to a data center of the IoT (for example, located in the IoT or in Internet 110). Each IoT device can transmit the collected data to the connected IoT device manager. For example, IoT devices 132, . . . , and 134 may transmit the collected data to IoT device manager 130.

In order to ensure that data from each IoT device can be completely recorded, the original data collected may be backed up. Alternatively and/or additionally, configuration information or other information of the IoT device may be backed up regularly. Currently, a backup technical solution based on a client-server structure has been provided. However, the number of IoT devices in the IoT is huge and the processing power is limited, and it is difficult to deploy a backup client at each IoT device. In addition, IoT data usually involves private information, has a high frequency of collection, involves a complex working environment, has a wide range of data diversity, and supports multiple data transmission protocols. Therefore, it is difficult to transplant existing data backup technical solutions to the IoT environment.

To address the above defects, embodiments of the present disclosure provide a technical solution for backing up data in an IoT system. Specifically, a registration mechanism is proposed, which may register one or more IoT devices to an IoT device manager, so that the IoT device manager may manage backup of data from one or more registered IoT devices. Furthermore, the basic unit of data backup based on a backup data package is proposed. Here, the backup data package is generated based on the data to be backed up from one or more IoT devices.

In accordance with one or more embodiments of the present disclosure, data collected by a large number of IoT devices in the IoT system may be encapsulated into a backup data package. In this way, a large number of IoT devices may be managed in a more centralized manner, and there is no need to perform backup operations for each IoT device one by one. By means of the technical solution according to one or more embodiments of the present disclosure, the complexity of the backup operation may be reduced, thereby improving the backup efficiency.

Figure 2:
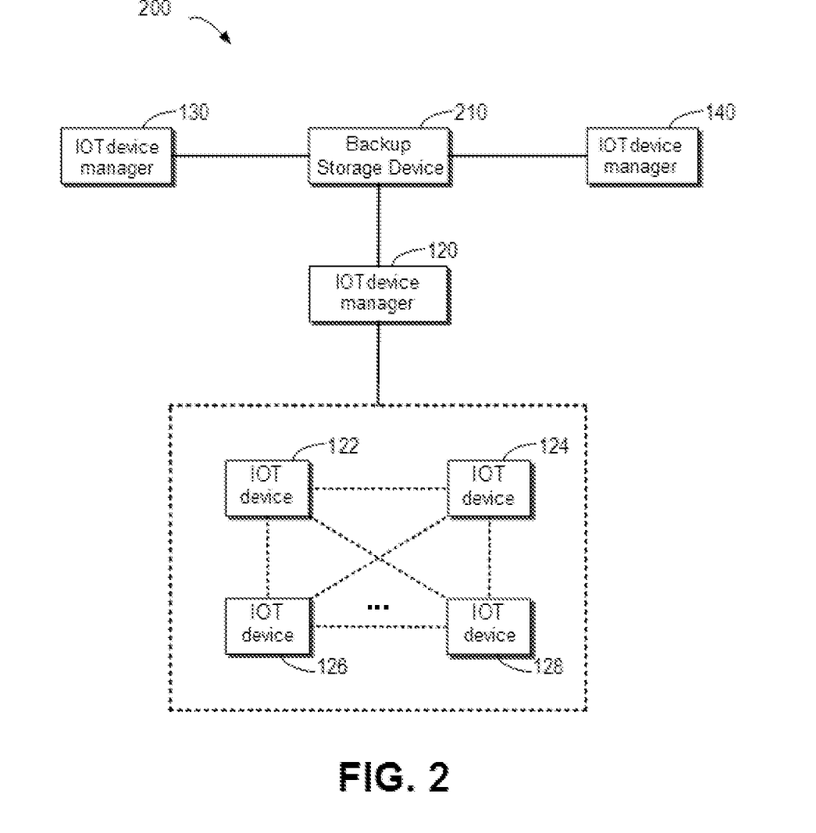
FIG. 2 schematically illustrates a block diagram of a process for backing up data in an IoT according to one or more embodiments of the present disclosure.

Hereinafter, a process according to one or more embodiments of the present disclosure is described in general with reference to FIG. 2. FIG. 2 schematically illustrates block diagram 200 of a process for backing up data in an IoT system according to one or more embodiments of the present disclosure. Multiple IoT devices in an IoT system may be registered to an IoT device manager. As shown in FIG. 2, IoT devices 122, 124, 126, . . . , and 128 in the IoT system may be registered to IoT device manager 120. Similarly, multiple other IoT devices may be registered to other IoT device managers 130 and 140 respectively. At this time, each IoT device manager may manage data from registered IoT devices in a centralized manner, and generate a backup data package based on the received data.

Figure 3:
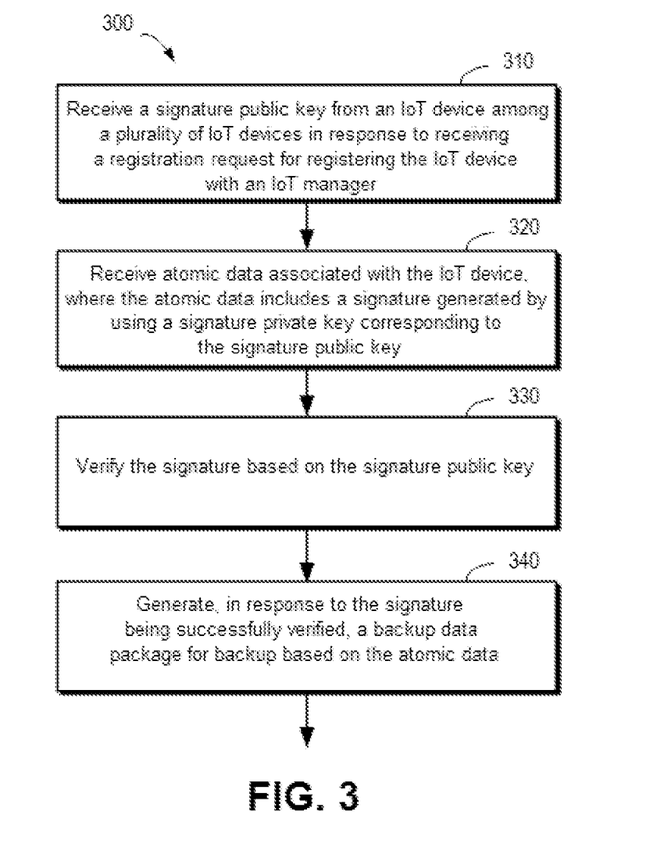
FIG. 3 schematically illustrates a flow chart of a method for backing up data in an IoT according to one or more embodiments of the present disclosure.

Hereinafter, more details will be described with reference to FIG. 3. FIG. 3 schematically illustrates flow chart 300 of a method for backing up data in an IoT system according to one or more embodiments of the present disclosure. According to one or more embodiments of the present disclosure, method 300 may be executed by an IoT device manager in an IoT system. In this way, the IoT device manager may manage the data to be backed up from a large number of IoT devices in a relatively centralized manner.

At block 310 of FIG. 3, in response to receiving a registration request for registering IoT device 122 among a plurality of IoT devices with an IoT manager, a signature public key is received from IoT device 122. According to one or more embodiments of the present disclosure, an administrator of the IoT system may specify which IoT device manager to register the IoT device. For example, a registration relationship may be set according to the network topology of each device in the IoT system.

According to one or more embodiments of the present disclosure, each IoT device may generate its own signature key pair (for example, a signature public key and a signature private key). Here, the signature private key may be used by the IoT device itself, and may be used to sign the data from itself, so as to prove validity of the data source. IoT device 122 may send the signed public key to corresponding IoT device manager 120, so that IoT device manager 120 verifies whether the received data to be backed up comes from a desired IoT device.

Figure 4:
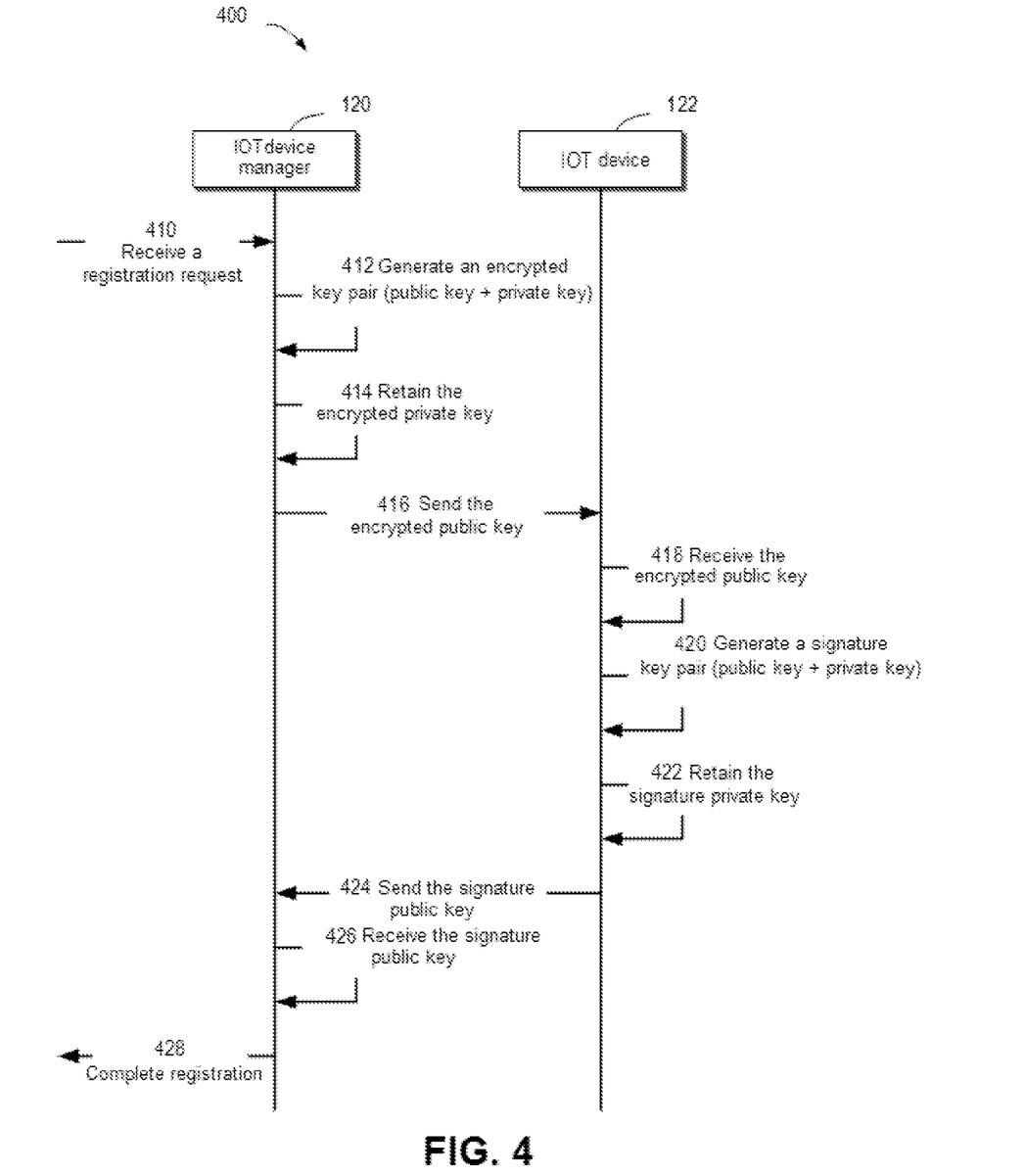
FIG. 4 schematically illustrates a block diagram of a process for registering an IoT device with an IoT device manager according to one or more embodiments of the present disclosure.

Hereinafter, more details about registration will be described with reference to FIG. 4. FIG. 4 schematically illustrates a block diagram of process 400 for registering IoT device 122 with IoT device manager 120 according to one or more embodiments of the present disclosure. As shown in FIG. 4, IoT device manager 120 may receive 410 a registration request. According to one or more embodiments of the present disclosure, the source of the registration request is not limited, but the registration request may come from the administrator of the IoT system, a backup server of the IoT system, or from other devices. After receiving the registration request, IoT device manager 120 may generate 412 an encrypted key pair. Then, IoT device manager 120 may retain 414 the encrypted private key locally, and send encrypted public key 416 to IoT device 122.

After receiving 418 the encrypted public key, IoT device 122 may generate 420 a signature key pair (for example, a signature public key and a signature private key). IoT device 122 may locally retain 422 the signature private key, and send 424 the signature public key to IoT device manager 120. IoT device manager 120 may receive 426 the signature public key, and the registration process is now completed 428. It will be understood that the case of registering IoT device 122 to IoT device manager 120 is described above only with reference to FIG. 4. When the IoT system includes multiple IoT device managers and multiple IoT devices, the registration relationship between the IoT device managers and the IoT devices may be determined based on the network topology of the IoT system. Then, each IoT device may be registered to a corresponding IoT device manager in a similar manner.

Figure 5:
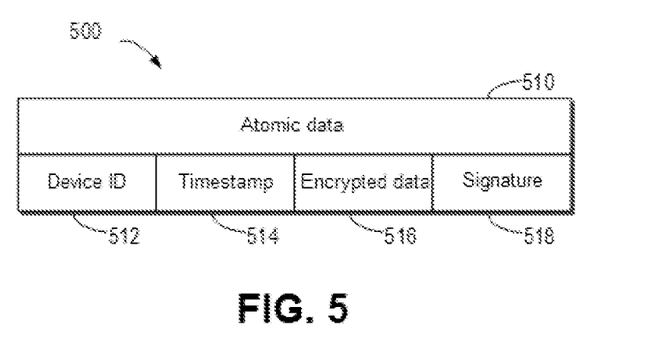
FIG. 5 schematically illustrates a block diagram of a data structure of IoT atomic data for backup according to one or more embodiments of the present disclosure.

In the following, return to FIG. 3 to describe more details about receiving data to be backed up from the IoT device. At block 320 of FIG. 3, atomic data associated with IoT device 122 is received, where the atomic data includes a signature generated by using a signature private key corresponding to the signature public key. Hereinafter, a data structure of atomic data will be described with reference to FIG. 5. FIG. 5 schematically illustrates block diagram 500 of a data structure of IoT atomic data for backup according to one or more embodiments of the present disclosure. As shown in FIG. 5, atomic data 510 may include one or more of the following fields: device ID 512, timestamp 514, encrypted data 516, and signature 518.

Here, device ID 512 represents as an identifier of the IoT device as a data source. Timestamp 514 represents relevant time information of collecting original data. It will be understood that the original data herein may include data (for example, images, etc.) collected by IoT device 122, or may include configuration information of IoT device 122 itself. Encrypted data 516 represents data obtained by encrypting the collected original data. Signature 518 represents a signature for the device ID, timestamp 514, and encrypted data 516. Signature 518 may be generated by IoT device 122 using the signature private key, and signature 518 may be used to verify whether atomic data 510 actually comes from IoT device 122.

According to one or more embodiments of the present disclosure, IoT device manager 120 may generate an encrypted public key and an encrypted private key. Here, IoT device manager 120 may send the encrypted public key to the IoT devices (for example, IoT device 122) registered to and managed by IoT device manager 120. After receiving the encrypted public key, IoT device 122 may use the encrypted public key to encrypt the collected original data, so as to generate encrypted data 516.

According to one or more embodiments of the present disclosure, different encrypted key pairs can be generated for each IoT device, so as to ensure security of data transmission. According to one or more embodiments of the present disclosure, encrypted data 516 in atomic data 510 is only decryptable for a device with a relevant key. In this way, data security during transmission and storage of atomic data 510 may be ensured.

According to one or more embodiments of the present disclosure, each IoT device in the IoT system may generate corresponding atomic data for each piece of collected original data according to a format shown in FIG. 5. Then, the IoT device may send atomic data to IoT device manager 120 at a predetermined frequency. In the context of the present disclosure, IoT device manager 120 may simultaneously manage a large number of IoT devices registered to it. At this time, IoT device manager 120 may receive a large amount of atomic data from a large number of IoT devices. In this way, IoT device manager 120 may manage a large amount of atomic data in a centralized manner, without the need to deploy a backup client for performing backup at each IoT device.

Figure 6:
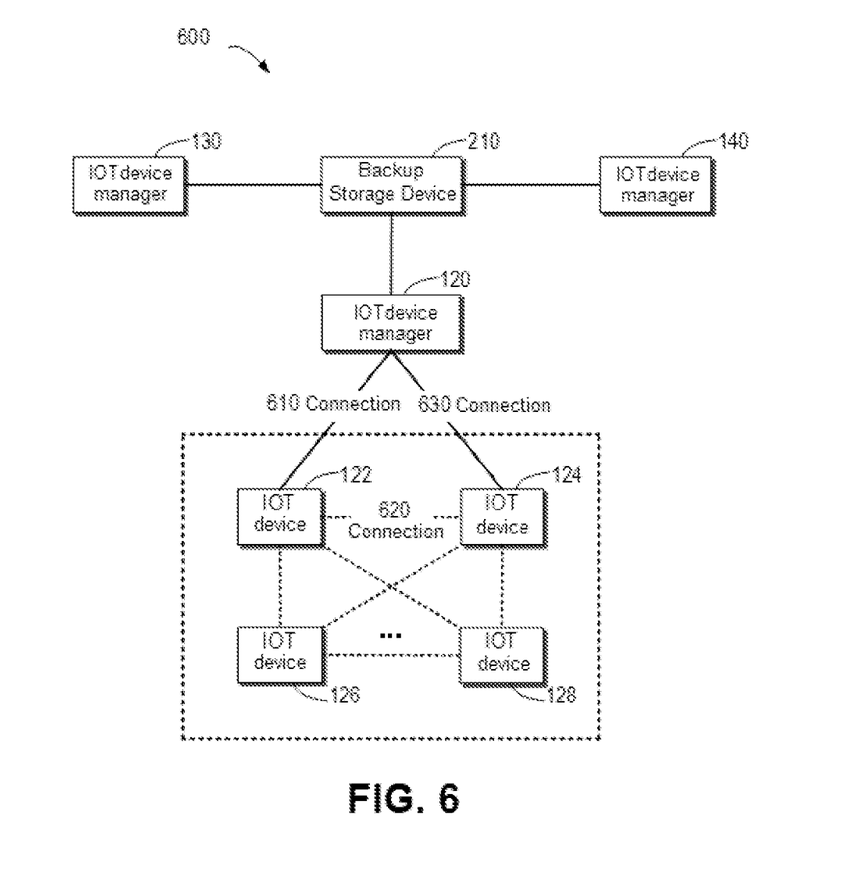
FIG. 6 schematically illustrates a block diagram of a process for transmitting IoT atomic data according to one or more embodiments of the present disclosure.

According to one or more embodiments of the present disclosure, atomic data 510 may be received in various ways. Hereinafter, more details about receiving atomic data 510 will be described with reference to FIG. 6. FIG. 6 schematically illustrates block diagram 600 of process 600 for transmitting IoT atomic data according to one or more embodiments of the present disclosure. As shown in FIG. 6, IoT device manager 120 and IoT device 122 are coupled to each other via a connection (for example, a WAN connection, a LAN connection, or other connections). If the working status of connection 610 is normal, IoT device manager 120 and IoT device 122 may communicate with each other. At this time, IoT device manager 120 may directly receive atomic data 510 from IoT device 122.

According to one or more embodiments of the present disclosure, between multiple IoT devices registered to the same IoT device manager 120, internal connections may be provided so that when a certain IoT device cannot be connected to IoT device manager 120, data may be forwarded via other IoT devices. If the working status of connection 610 is abnormal, IoT device manager 120 and IoT device 122 cannot communicate with each other. At this time, IoT device manager 120 may receive atomic data 510 via other IoT devices (for example, IoT device 124). As shown in FIG. 6, IoT device 122 is coupled to IoT device 124 via connection 620. At this time, IoT device 124 can be used to forward atomic data 510 from IoT device 122 to IoT device manager 120 via connections 620 and 630. In the context of the present disclosure, connection 620 may have different types. Based on the setting of the IoT system, connection 620 may be based on any one of the following: a Bluetooth technology, a short-range communication technology, a Zigbee technology, and so on.

Hereinafter, the process of verifying the source of atomic data 510 will be described by returning to FIG. 3. At block 330 of FIG. 3, the signature is verified based on the signature public key. Here, IoT device manager 120 may use the signature public key from IoT device 122 to verify whether signature 518 in received atomic data 510 is valid. If IoT device manager 120 determines that signature 518 cannot match the signature public key, it is considered that received atomic data 510 does not come from expected IoT device 122. At this time, it can be considered that the IoT system may be under attack, and an alarm can be issued to prompt an administrator of the IoT system to take security measures in time. If IoT device manager 120 determines that signature 518 matches the signature public key, it is considered that received atomic data 510 is truly come from IoT device 122. Then, a backup operation may be performed based on received atomic data 510.

Figure 7:
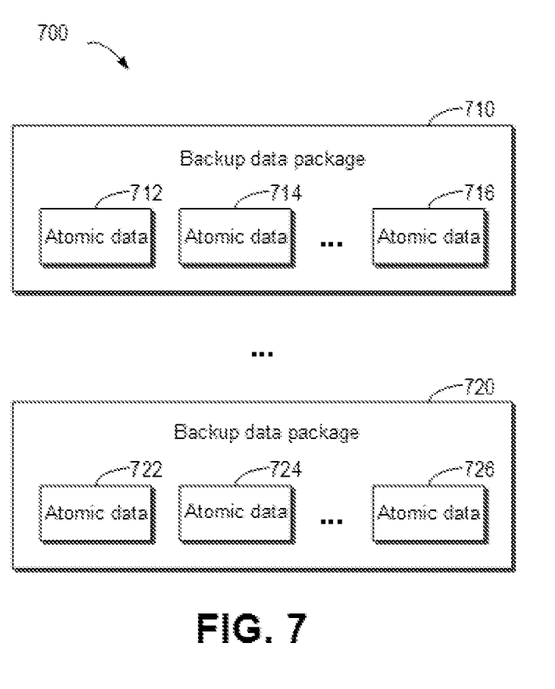
FIG. 7 schematically illustrates a block diagram of a data structure of a backup data package according to one or more embodiments of the present disclosure.

Further referring to FIG. 3, at block 340, in response to signature 518 being successfully verified, a backup data package for backup is generated based on atomic data 510. Hereinafter, more details about the backup data package will be described with reference to FIG. 7. FIG. 7 schematically illustrates a block diagram of data structure 700 of a backup data package according to one or more embodiments of the present disclosure. With operations of an IoT system, IoT device manager 120 may receive a large amount of atomic data from the same or different IoT devices at different points in time. A backup data package may be generated based on predetermined rules, for example, the amount of atomic data in the backup data package may be defined.

Specifically, IoT device manager 120 may receive atomic data 712, 714, . . . , and 716. The received atomic data may be stored in the cache at IoT device manager 120 first, and when the atomic data in the cache reaches a predetermined amount, backup data package 710 may be generated based on atomic data 712, 714, . . . , and 716. IoT device manager 120 may continuously receive atomic data, for example, may generate another backup data packet 720 based on received atomic data 722, 724, . . . , and 726.

According to one or more embodiments of the present disclosure, a backup data package may be generated based on other rules. For example, the backup data package may be generated at predetermined time intervals (for example, every hour, every day, etc.), the backup data package may be generated based on a generation request, and so on. According to one or more embodiments of the present disclosure, a backup condition may be specified, and the generated backup data package is stored in a backup device when the backup condition is met. For example, the backup condition may specify that each time a backup data package is generated, the generated backup data package is stored in the backup device. For another example, the backup condition may specify that when the generated data packets reach a predetermined number (for example, 5 or other numbers), the generated backup data packets are stored in the backup device. For another example, the backup condition may specify to store the generated backup data package to the backup device in response to the backup request, and so on.

With embodiments of the present disclosure, the backup data packet is used as the smallest data unit of the backup operation. In this way, it is not necessary to back up massive data from a large number of IoT devices one by one, but to encapsulate data to be backed up into a backup data package and perform a unified backup operation.

Figure 8:
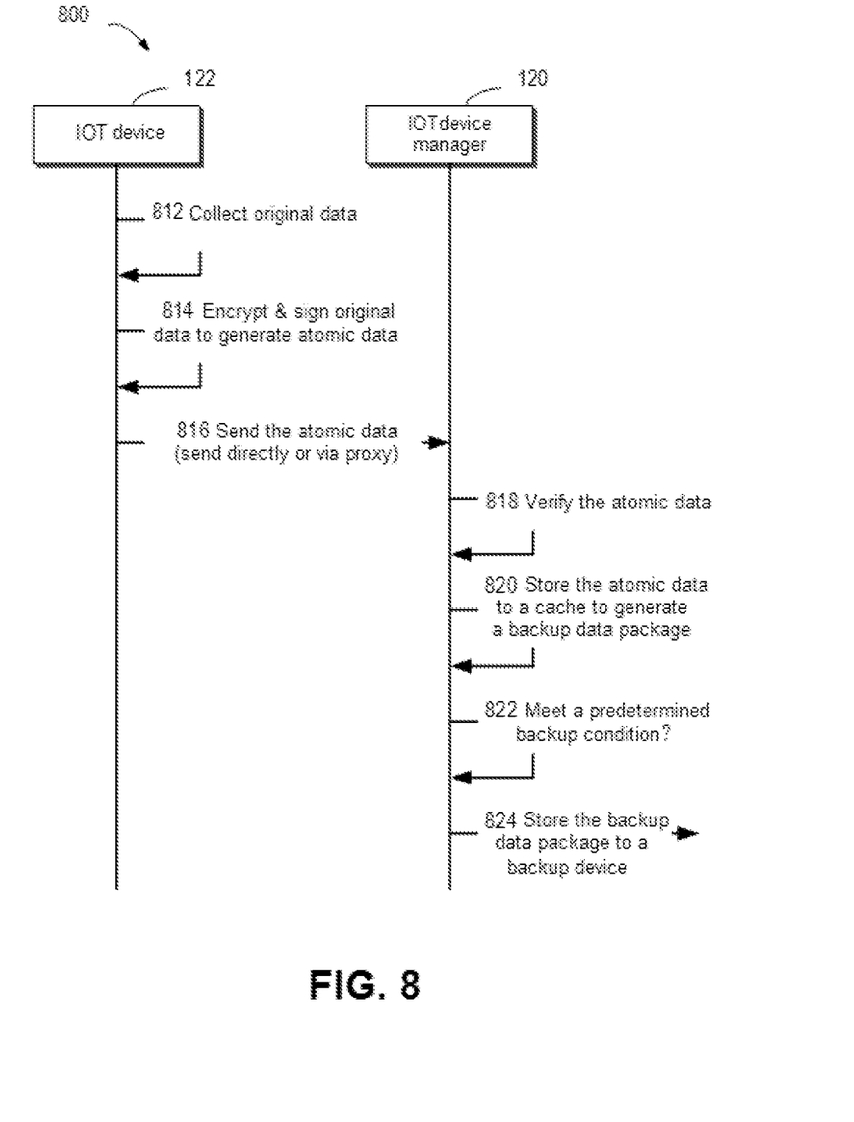
FIG. 8 schematically illustrates a block diagram of a process for uploading data from an IoT device to an IoT device manager according to one or more embodiments of the present disclosure.

Hereinafter, more details about the backup operation will be described with reference to FIG. 8. FIG. 8 schematically illustrates a block diagram of process 800 for uploading data from IoT device 122 to IoT device manager 120 according to one or more embodiments of the present disclosure. As shown in FIG. 8, IoT device 122 may continuously collect 812 original data. Then, IoT device 122 may perform encryption and signature operations on the collected original data according to the format shown in FIG. 5, so as to generate atomic data 510. IoT device 122 may send 816 atomic data to IoT device manager 120. Specifically, IoT device 122 may send directly or may forward via another IoT device as a proxy.

IoT device manager 120 may verify 818 received atomic data 510. If atomic data 510 is successfully verified, IoT device manager 120 may store 820 atomic data 510 in a local cache, so as to generate a backup data package. If the predetermined backup condition is met 822, the backup data package may be stored 824 to a backup device. In this way, IoT device manager 120 can back up data from a large number of IoT devices in a simpler and more effective way.

Figure 9:
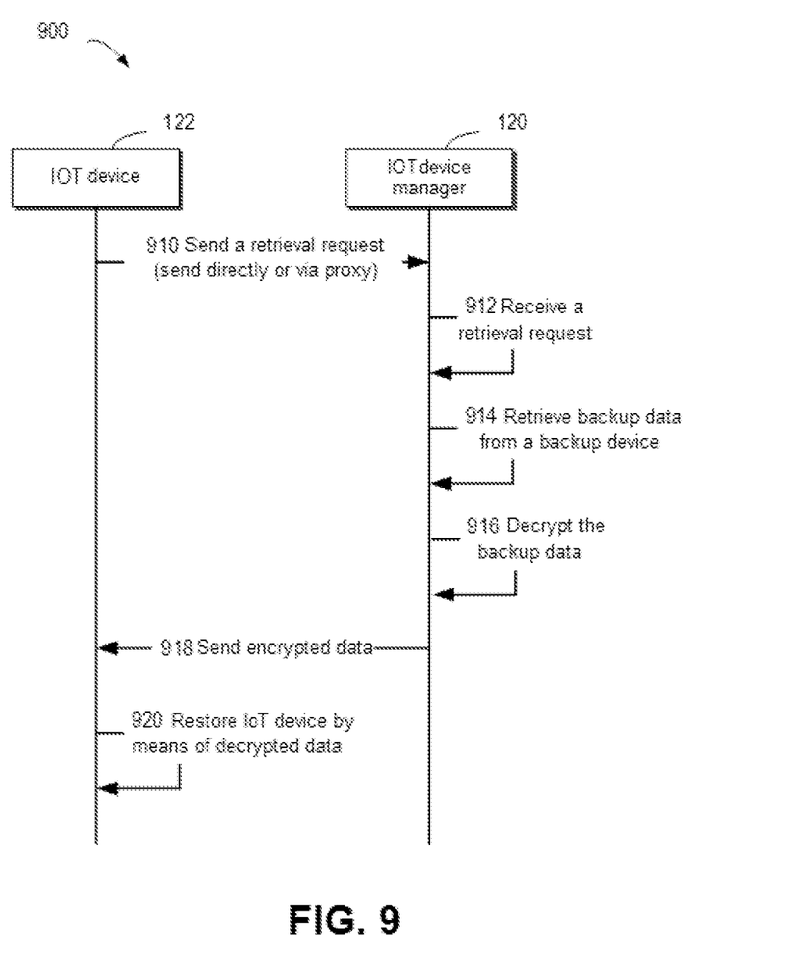
FIG. 9 schematically illustrates a block diagram of a process for downloading data from an IoT device manager to an IoT device according to one or more embodiments of the present disclosure.

According to one or more embodiments of the present disclosure, backup data may be retrieved from a backup server. Hereinafter, more details about backup data retrieval will be described with reference to FIG. 9. FIG. 9 schematically illustrates a block diagram of process 900 for downloading data from IoT device manager 120 to IoT device 122 according to one or more embodiments of the present disclosure. As shown in FIG. 9, IoT device 122 may send 910 a retrieval request to IoT device manager 120.

According to one or more embodiments of the present disclosure, the retrieval request may be sent in various ways. For example, if IoT device manager 120 is connected to IoT device 122, IoT device 122 may directly send a retrieval request to IoT device manager 120 (at this time, IoT device manager 120 directly receives a retrieval request from IoT device 122). For another example, if IoT device manager 120 is not connected to IoT device 122, IoT device 122 may forward a retrieval request to IoT device manager 120 via another IoT device (at this time, IoT device manager 120 receives a retrieval request from another IoT device).

Here, the retrieval request may include a device ID and a timestamp related to data to be retrieved. IoT device manager 120 may receive 912 the retrieval request. If receives a request for retrieval, the IoT device manager 120 may retrieve 914 backup data associated with the retrieval request from the backup device. For example, based on the device ID and timestamp in the retrieval request, the corresponding backup data (that is, the atomic data) may be searched for in each piece of the atomic data in the multiple backup data packets in the backup device. Then, the found atomic data may be decrypted 916 based on the encrypted private key to generate decrypted data. Further, IoT device manager 120 may send 918 the decrypted data to IoT device 122. It will be understood that the data to be sent here is data that has been decrypted. In order to avoid data leakage, the data needs to be sent directly to IoT device 122.

According to one or more embodiments of the present disclosure, IoT device 122 may restore the previously backed-up configuration information from the backup device. At this time, IoT device 122 may receive configuration information with a designated time stamp, so as to restore 920 IoT device 122 to a desired configuration version. In accordance with one or more embodiments of the present disclosure, the desired backup data may be quickly found from the backup device, and then IoT device 122 may be restored to the desired configuration.

Examples of the methods according to the present disclosure have been described in detail above with reference to FIGS. 2 to 9, and implementations of a corresponding apparatus will be described below. According to one or more embodiments of the present disclosure, an apparatus for backing up data in an IoT system is provided. The IoT system includes an IoT manager and a plurality of IoT devices, and the apparatus includes: a signature public key receiving module configured to receive a signature public key from an IoT device among a plurality of IoT devices in response to receiving a registration request for registering the IoT device with an IoT manager; an atomic data receiving module configured to receive atomic data associated with the IoT device, where the atomic data includes a signature generated by using a signature private key corresponding to the signature public key; a verifying module configured to verify the signature based on the signature public key; and a generation module configured to generate, in response to the signature being successfully verified, a backup data package for backup based on the atomic data. According to one or more embodiments of the present disclosure, the apparatus further includes modules configured to execute other steps of method 300 described above.

According to one or more embodiments of the present disclosure, an electronic device is provided, including: at least one processor; a volatile memory; and a memory coupled to the at least one processor, the memory having instructions stored therein, where the instructions, when executed by the at least one processor, cause the device to execute a method for backing up data in an IoT system. The IoT system includes an IoT manager and a plurality of IoT devices, and the method includes: receiving a signature public key from an IoT device among a plurality of IoT devices in response to receiving a registration request for registering the IoT device with an IoT manager; receiving atomic data associated with the IoT device, where the atomic data includes a signature generated by using a signature private key corresponding to the signature public key; verifying the signature based on the signature public key; and generating, in response to the signature being successfully verified, a backup data package for backup based on the atomic data.

According to one or more embodiments of the present disclosure, the method further includes: generating an encrypted public key and an encrypted private key; and sending the encrypted public key to the IoT device.

According to one or more embodiments of the present disclosure, the atomic data further includes encrypted data, and the encrypted data is obtained by encrypting the original data from the IoT device by means of the encrypted public key.

According to one or more embodiments of the present disclosure, the encrypted data is generated by the IoT device, and the atomic data further includes an identifier of the IoT device and a timestamp corresponding to the original data.

According to one or more embodiments of the present disclosure, receiving the atomic data comprises at least any one of the following: receiving the atomic data from the IoT device in response to determining that the IoT device manager is connected to the IoT device; and receiving the atomic data via another IoT device connected to the IoT device in response to determining that the IoT device manager is not connected to the IoT device.

According to one or more embodiments of the present disclosure, the method further includes storing the backup data package to a backup device associated with the IoT system in response to determining that a predetermined backup condition is satisfied.

According to one or more embodiments of the present disclosure, the method further includes: in response to receiving a retrieval request for retrieving data associated with the IoT device, acquiring backup data associated with the retrieval request from the backup device; decrypting the backup data based on the encrypted private key to generate decrypted data; and sending the decrypted data to the IoT device, wherein the decrypted data is used to restore the configuration information of the IoT device.

According to one or more embodiments of the present disclosure, receiving the retrieval request includes at least any one of the following: receiving the retrieval request from the IoT device in response to determining that the IoT device manager is connected to the IoT device; and receiving the retrieval request via another IoT device connected to the IoT device in response to determining that the IoT device manager is not connected to the IoT device.

According to one or more embodiments of the present disclosure, the method further includes: providing, in response to the atomic data being not successfully verified, an alert of the intrusion of the IoT system.

According to one or more embodiments of the present disclosure, the device is deployed at the IoT device manager.

Figure 10:
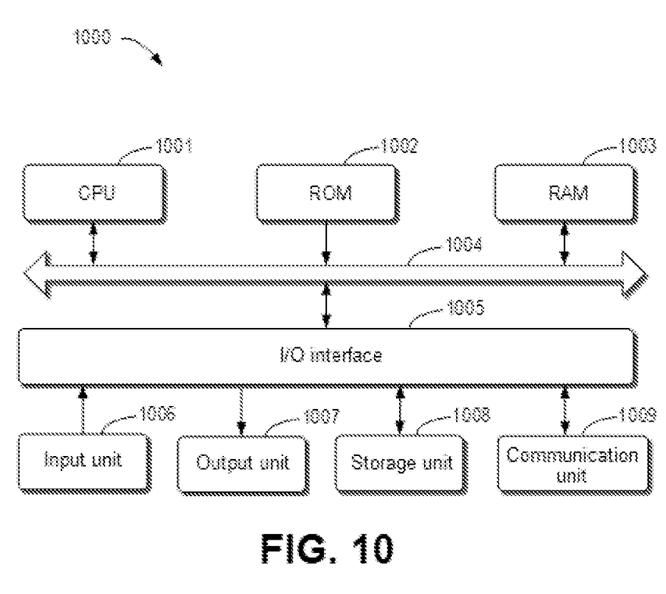
FIG. 10 schematically illustrates a block diagram of a device for backing up data in an IoT according to one or more embodiments of the present disclosure.

FIG. 10 schematically illustrates a block diagram of device 1000 for backing up data in an IoT according to one or more embodiments of the present disclosure. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 may also be stored. CPU 1001, ROM 1002, and RAM 1003 are connected to one another through bus 1004. Input/output (I/O) interface 1005 is also connected to bus 1004.

Multiple components in device 1000 are connected to I/O interface 1005, including: input unit 1006, such as a keyboard and a mouse; output unit 1007, such as various types of displays and speakers; storage unit 1008, such as a magnetic disk and an optical disk; and communication unit 1009, such as a network card, a modem, and a wireless communication transceiver. Communication unit 1009 allows device 1000 to exchange information/data with other devices over a computer network such as the Internet and/or various telecommunication networks.

The processes and processing described above, such as method 300, may be performed by processing unit 1001. For example, in some implementations, method 300 may be implemented as a computer software program that is tangibly included in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of method 300 described above may be performed. Alternatively, in other implementations, CPU 1001 may also be configured in any other suitable manner to implement the above-mentioned processes/methods.

According to one or more embodiments of the present disclosure, a computer program product is provided, which is tangibly stored on a non-transitory computer-readable medium and includes machine-executable instructions, where the machine-executable instructions are used to perform the methods according to the present disclosure.

According to one or more embodiments of the present disclosure, a computer-readable medium is provided. The computer-readable medium has machine-executable instructions stored thereon, and when executed by at least one processor, the machine-executable instructions cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Smalltalk and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, where the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for backing up data in an Internet of Things (IoT) system, wherein the IoT system comprises an IoT manager and a plurality of IoT devices, the method comprises:
   receiving, by the IoT manager, a signature public key from an IoT device among the plurality of IoT devices in response to receiving a registration request for registering the IoT device with the IoT manager;
   receiving, by the IoT manager, atomic data associated with the IoT device, wherein the atomic data is generated by the IoT device and comprises:
      a device ID identifying the IoT device;
      a timestamp specifying a time at which original data is collected from the IoT device;
      encrypted data which is generated by encrypting the original data using an encrypted public key, wherein the encrypted public key is obtained by the IoT device from the IoT manager;
      a signature generated by using the device ID, the timestamp, the encrypted data, and a signature private key corresponding to the signature public key, wherein the signature public key and signature private key are generated by the IoT device;
   verifying the signature based on the signature public key; and generating, in response to the signature being successfully verified, a backup data package for backup based on the atomic data.

2. The method according to claim 1, wherein the method further comprises:
receiving, by the IoT manager, the encrypted public key and an encrypted private key; and
sending, by the IoT manager, the encrypted public key to the IoT device.

3. The method according to claim 1, wherein receiving the atomic data further comprises at least one of the following:
receiving the atomic data from the IoT device in response to determining that the IoT manager is connected to the IoT device; and
receiving the atomic data via another IoT device connected to the IoT device in response to determining that the IoT manager is not connected to the IoT device.

4. The method according to claim 2, further comprising:
storing the backup data package to a backup device associated with the IoT system in response to determining that a predetermined backup condition is satisfied.

5. The method according to claim 4, further comprising:
obtaining, in response to receiving a retrieval request for retrieving data associated with the IoT device, backup data associated with the retrieval request from the backup device;
decrypting the backup data based on the encrypted private key to generate decrypted data; and
sending the decrypted data to the IoT device, wherein the decrypted data is used to restore configuration information of the IoT device.

6. The method according to claim 5, wherein receiving the retrieval request comprises at least one of the following:
receiving the retrieval request from the IoT device in response to determining that the IoT manager is connected to the IoT device; and
receiving the retrieval request via another IoT device connected to the IoT device in response to determining that the IoT manager is not connected to the IoT device.

7. The method according to claim 1, further comprising: providing, in response to the atomic data being not successfully verified, an alert of an intrusion of the IoT system.

8. An electronic device, wherein the electronic device is an IoT manager and comprises:
at least one processor;
a volatile memory; and
a memory coupled to the at least one processor, wherein the memory has instructions stored therein that, when executed by the at least one processor, cause the device to execute a method for backing up data in an IoT system, wherein the IoT system comprises the IoT manager and a plurality of IoT devices, the method comprises:
receiving a signature public key from an IoT device among the plurality of IoT devices in response to receiving a registration request for registering the IoT device with the IoT manager;
receiving atomic data associated with the IoT device, wherein the atomic data comprises:
a device ID identifying the IoT device;
a timestamp specifying a time at which original data is collected from the IoT device;
encrypted data which is generated by encrypting the original data using an encrypted public key, wherein the encrypted public key is obtained by the IoT device from the IoT manager;
a signature generated by using the device ID, the timestamp, the encrypted data, and a signature private key corresponding to the signature public key, wherein the signature public key and signature private key are generated by the IoT device;
verifying the signature based on the signature public key; and
generating, in response to the signature being successfully verified, a backup data package for backup based on the atomic data.

9. The device according to claim 8, wherein the method further comprises:
generating the encrypted public key and an encrypted private key; and
sending the encrypted public key to the IoT device.

10. The device according to claim 8, wherein receiving the atomic data further comprises at least one of the following:
receiving the atomic data from the IoT device in response to determining that the IoT manager is connected to the IoT device; and
receiving the atomic data via another IoT device connected to the IoT device in response to determining that the IoT manager is not connected to the IoT device.

11. The device according to claim 9, wherein the method further comprises: storing the backup data package to a backup device associated with the IoT system in response to determining that a predetermined backup condition is satisfied.

12. The device according to claim 11, wherein the method further comprises:
obtaining, in response to receiving a retrieval request for retrieving data associated with the IoT device,
backup data associated with the retrieval request from the backup device;
decrypting the backup data based on the encrypted private key to generate decrypted data; and
sending the decrypted data to the IoT device, wherein the decrypted data is used to restore configuration information of the IoT device.

13. The device according to claim 12, wherein receiving the retrieval request comprises at least one of the following:
receiving the retrieval request from the IoT device in response to determining that the IoT manager is connected to the IoT device; and
receiving the retrieval request via another IoT device connected to the IoT device in response to determining that the IoT manager is not connected to the IoT device.

14. The device according to claim 8, wherein the method further comprises:
providing, in response to the atomic data being not successfully verified, an alert of an intrusion of the IoT system, and the device is deployed at the IoT manager.

15. A non-transitory computer-readable medium comprising computer readable program code, which when executed by a computer processor on an IoT manager, enables the computer processor to:
receive a signature public key from an IoT device among a plurality of IoT devices in response to receiving a registration request for registering the IoT device with the IoT manager;
receive atomic data associated with the IoT device, wherein the atomic data comprises:
a device ID identifying the IoT device;
a timestamp specifying a time at which original data is collected from the IoT device;

encrypted data which is generated by encrypting the original data using an encrypted public key, wherein the encrypted public key is obtained by the IoT device from the IoT manager;

a signature generated by using the device ID, the timestamp, the encrypted data, and a signature private key corresponding to the signature public key, wherein the signature public key and signature private key are generated by the IoT device;

verifying the signature based on the signature public key; and generating, in response to the signature being successfully verified, a backup data package for backup based on the atomic data.

* * * * *